United States Patent [15] 3,640,734
Oppenheimer et al. [45] Feb. 8, 1972

[54] PREPARATION OF FIBROUS REINFORCED CASING FROM ALKALI SOLUBLE POLYVINYL ALCOHOL COPOLYMERS

[72] Inventors: Seymour Oppenheimer, Chicago; Albin F. Turbak, Danville, both of Ill.

[73] Assignee: Tee-Pak, Inc., Chicago, Ill.

[22] Filed: Oct. 21, 1968

[21] Appl. No.: 769,026

[52] U.S. Cl. ..................99/176, 161/88, 260/91.3 VA
[51] Int. Cl. .....................................A22c 13/00
[58] Field of Search ..................99/171, 174, 176, 175; 260/91.3 VA; 156/237; 117/94; 161/88, 247

[56] References Cited

UNITED STATES PATENTS

| | | | |
|---|---|---|---|
| 2,169,250 | 8/1939 | Izard | 99/176 UX |
| 2,430,065 | 11/1947 | Leach | 99/171 X |
| 2,686,726 | 8/1954 | Grantham | 99/176 |
| 2,780,401 | 2/1957 | Stevens | 99/174 UX |
| 2,952,550 | 9/1960 | Parlour | 99/176 |
| 3,135,613 | 6/1964 | Underwood | 99/176 |
| 2,210,436 | 8/1940 | Weingand | 99/176 |
| 3,348,997 | 10/1967 | Lagully | 260/91.3 X |
| 3,505,264 | 4/1970 | Thoese | 260/91.3 X |
| 2,993,825 | 7/1961 | Gage | 161/88 X |
| 3,262,905 | 7/1966 | Martins | 260/45.7 P |
| 3,061,458 | 10/1962 | Arguette | 260/91.3 UA |
| 3,320,200 | 5/1967 | Kane | 156/327 X |
| 3,516,960 | 6/1970 | Martins | 99/176 X |

FOREIGN PATENTS OR APPLICATIONS 386,161   1/1933   Great Britain .........................99/176

Primary Examiner—Frank W. Lutter
Assistant Examiner—Robert Halper
Attorney—Neal J. Mosely

[57] ABSTRACT

A novel fibrous casing for packaging sausages and other meat and food products comprises a saturating tissue, preferably a long fiber hemp paper, coated or impregnated with an insolubilized polyvinyl alcohol/polyvinyl ester copolymer. The casing is preferably prepared by coating or impregnating a saturating tissue with an aqueous alkaline solution of a polyvinyl alcohol/polyvinyl ester copolymer which is then insolubilized by treatment with acid and optionally by further treatment with a suitable cross-linking agent, viz formaldehyde, etc. The saturating tissue may be coated or impregnated with the polyvinyl alcohol copolymer solution and immediately formed into a tubular casing and the polyvinyl alcohol copolymer regenerated therein by acid treatment or may be coated or impregnated in sheet form, neutralized and dried and subsequently slit to size and formed into a tubular casing in a separate seaming operation. Casings are preferably formed using long fiber hemp paper as the saturating tissue and using polyvinyl alcohol copolymers having a D.S. of OH groups in the range from about 25–80 percent.

14 Claims, 1 Drawing Figure

PATENTED FEB 8 1972
3,640,734
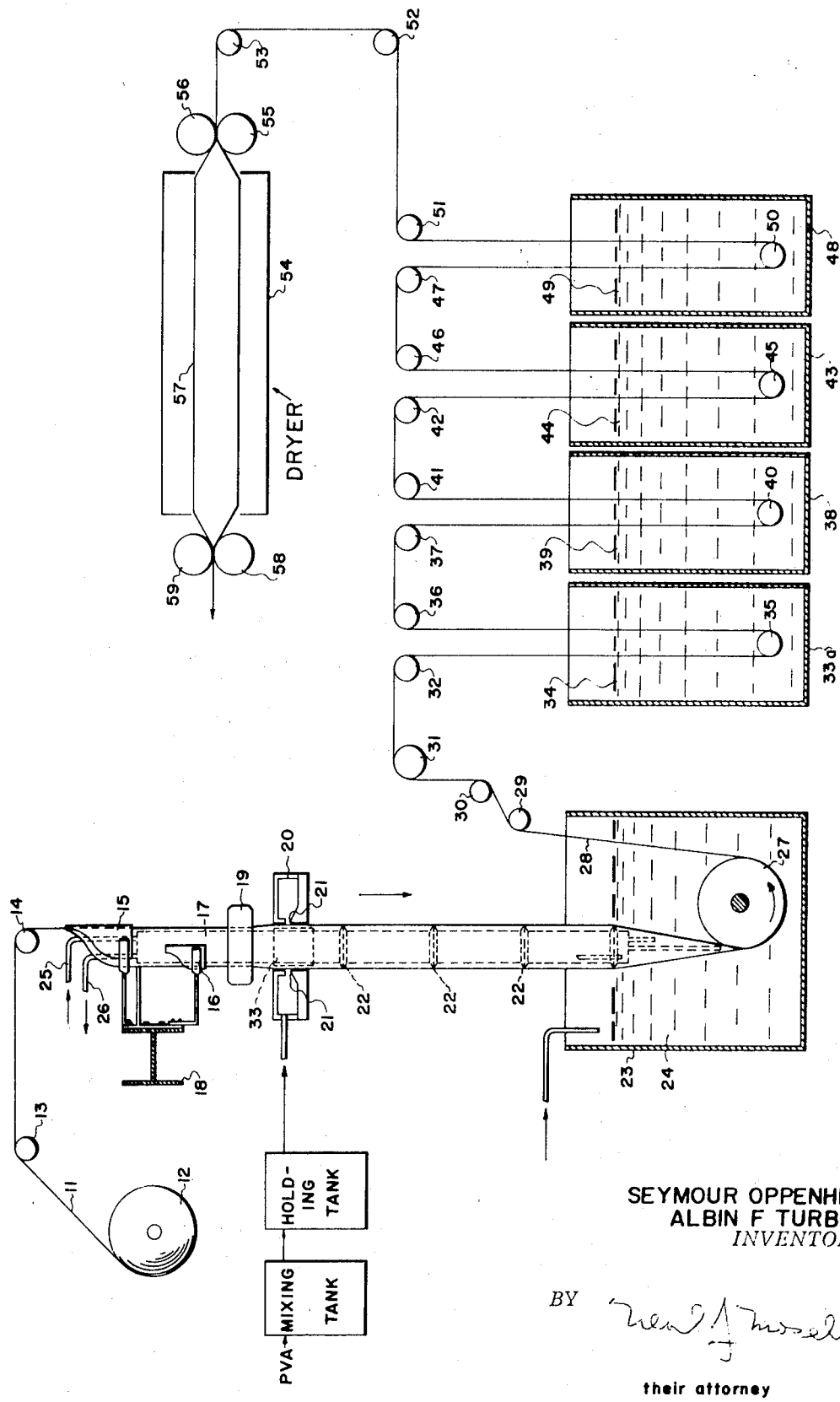
SEYMOUR OPPENHEIMER
ALBIN F TURBAK
*INVENTORS*
BY
*their attorney*

3,640,734

PREPARATION OF FIBROUS REINFORCED CASING FROM ALKALI SOLUBLE POLYVINYL ALCOHOL COPOLYMERS

BACKGROUND OF THE INVENTION

1. Field of the Invention

This invention relates to new and improved sausage casings and the methods of preparing the same. More particularly, the invention is concerned with the preparation of sausage casings from polyvinyl alcohol copolymers. The invention is primarily directed to the production of novel fibrous casings comprising a tubular insolubilized polyvinyl alcohol copolymer film reinforced with a fibrous web, preferably a saturating tissue such as a long fiber hemp tissue.

2. Description of the Prior Art

Natural casings are prepared from the intestines of various edible animals, primarily cattle, hogs and sheep. The intestines are removed from the slaughtered animal and thoroughly cleaned by processes well known in the art. Natural casings, which have been thoroughly cleaned, are stuffed with various sausage meat compositions and formed into sausage links in preparation for cooking.

Prior to about 1925, substantially all sausage casings were natural casings prepared from animal intestines. Since that time, there have been developed several types of synthetic sausage casings. Some artificial sausage casings are prepared by reconstitution of a tubular film of animal hide fibers to yield a tough collagenous film. The major proportion of artificial casings, however, are prepared from regenerated cellulose, preferably by the viscose process, although some casings are manufactured by the cuprammonium process and also by denitration of extruded cellulose nitrate tubes.

There has been a considerable consumer acceptance of presliced sausages, such as bologna, salami, etc., which are sold in the form of relatively small conveniently sized packages, each package containing a small predetermined quantity of sausage in the form of a fixed number of slices. The reason for this is that the slicing of the sausage is performed mechanically, thus yielding a product of uniform thickness for ease of packaging. In order to provide a predetermined number of slices in a package of a given weight, it is essential that the diameter of the sausage be carefully controlled. In the preparation of sausages by the meat packer, the sausage emulsion is inserted into the sausage casing which is subsequently tied off at each end and cooked or cooked and smoked. In order to assure uniformity of size of the sausage slices, casings are provided to the trade known as fibrous casings. Fibrous casing is composed of cellulosic fibers, preferably in the form of a paper, which are impregnated and held together by regenerated cellulose. The paper which is used is usually a saturating tissue, preferably a long fiber hemp paper, which is impregnated with viscose, formed into a tube, and treated in a coagulating and regenerating bath to regenerate cellulose within and upon the paper. The product is a paper reinforced regenerated cellulose casing having a relatively high strength and relatively low stretch.

Over a period of many years, cellulose casings have remained the most desirable and generally the most economical, in spite of the development of competing, cheaper plastics, because cellulose has properties of strength, both wet and dry, low stretch, and permeability to moisture vapor and smoke, which are required in the processing of sausage products. Other plastics, such as polyethylene, polyvinyl chloride, etc., which are easy to process in film form have never produced satisfactory sausage casings because of the deficiency in smoke or moisture vapor permeability. Also, most of the common plastic packaging films are too stretchy for use in the formation of sausage casings. Polyvinyl alcohol has the advantage of being easily formed into films which have a high-moisture vapor and soak permeability but is excessively stretchy, particularly when wet. Polyvinyl alcohol films have satisfactory dry strength that when wet exhibit a stretch of up to 700 percent at break load.

STATEMENT OF OBJECTS AND FEATURES OF THE INVENTION

It is, therefore, one object of this invention to provide a new and improved fibrous reinforced polyvinyl alcohol copolymer sausage casing and method of preparing the same.

Another object of this invention is to provide a new and improved method for preparing fibrous reinforced polyvinyl alcohol copolymer casings by impregnation of a fibrous web from aqueous alkaline solution.

Another object of this invention is to provide a new and improved polyvinyl alcohol copolymer reinforced fibrous casing having high strength and low stretch under rewet conditions.

A feature of this invention is the provision of a new and improved casing comprising a tubular fibrous reinforced polyvinyl alcohol copolymer film, preferably insolubilized by treatment with a cross-linking agent.

Another feature of this invention is the provision of a new and improved method for the preparation of fibrous casing by coating or impregnating a saturating tissue, preferably a long fiber hemp paper, with aqueous alkaline solution of a polyvinyl alcohol copolymer and regenerating the polyvinyl alcohol copolymer on and in the tissue by treatment with acid.

Another feature of this invention comprises a new and improved method for the preparation of fibrous casing wherein a saturating tissue is impregnated or coated with an aqueous alkaline solution of a polyvinyl alcohol copolymer, which is insolubilized therein by treatment with acid, and is subsequently formed into a tube.

Other objects and features of this invention will become apparent from time to time throughout the specification and claims as hereinafter related.

SUMMARY OF THE INVENTION

This invention comprises a new and improved fibrous casing and method of preparing the same. The saturating tissue or other woven or nonwoven fibrous web, preferably a long fiber hemp paper, is impregnated or coated with an aqueous alkaline solution of polyvinyl alcohol copolymer and the impregnated or coated paper treated with acid to regenerate the copolymer therein. The polyvinyl alcohol copolymer may be further treated with a cross-linking agent, such as formaldehyde, etc., to render the coated or impregnated web relatively insensitive to moisture. The finished fibrous reinforced polyvinyl alcohol copolymer film may be formed into a tubular casing at the time of impregnation and regeneration of the copolymer therein or may be cut to a desired size after regeneration of the copolymer in the web and the narrower widths formed into tubular casings by means of a suitable adhesive seaming step. In carrying out this process, it is preferred to use alkali soluble grades of polyvinyl alcohol/polyvinyl ester copolymers having a D.S. of OH groups in the range of about 10–80 percent and molecular weight greater than about 50,000.

BRIEF DESCRIPTION OF THE DRAWINGS

In the accompanying drawing, the single FIGURE shown is a diagrammatic view of a continuous process for impregnating a fibrous web with a polyvinyl alcohol copolymer in aqueous alkaline solution and regeneration of the copolymer in the web to form the same into a casing.

DESCRIPTION OF THE PREFERRED EMBODIMENTS

This invention relates to new and useful improvements in food casings and more particularly to new and improved fibrous casings for use in packaging or processing sausage or other meat or food products. In the preferred embodiments of this invention, an aqueous alkaline solution of polyvinyl alcohol/polyvinyl ester copolymer is impregnated in or coated upon a fibrous web, preferably a saturating tissue such as a long fiber hemp paper. The alkaline polyvinyl alcohol/polyvinyl ester copolymer solution may be applied by any of a variety of well-known coating techniques. The impregnated or coated fibrous web may then have the copolymer regenerated therein by treatment with acid and dried and subsequently slit and formed into tubular casings of desired size or may be directly formed into a tubular casing at the time of impregnation or coating and regeneration of the copolymer in the web. In either case, the polyvinyl alcohol/polyvinyl ester copolymer is insolubilized by acid treatment after coating or impregnation on the fibrous web and may, if desired, be rendered less sensitive to moisture by further treatment with a cross-linking agent.

The term "copolymer" or "polyvinyl alcohol/polyvinyl ester copolymer," as used herein, is intended to cover vinyl alcohol copolymers having a D.S. with respect to OH groups in the range from about 25–80 percent (D.S. 0.25–0.80). Vinyl alcohol, as a monomer, is not known to exist. All attempts to prepare vinyl alcohol have resulted in the rearrangement of the compound to acetaldehyde. Polyvinyl alcohol is normally prepared by hydrolysis of polyvinyl esters, such as polyvinyl acetate, etc., usually in aqueous alcohol. As a result, the compounds which are known as "polyvinyl alcohol" commercially may vary considerably in D.S. (degree of substitution) with respect to the OH content. At a D.S., with respect to OH groups, less than about 80 percent, the polymer is normally referred to as a polyvinyl alcohol/polyvinyl ester copolymer. In the range of D.S. from about 40 to 80 percent, the copolymer is alkali soluble and has a reasonably high-moisture vapor and soak permeability when regenerated as a copolymer film. The polyvinyl alcohol copolymer may also contain carboxyl functionality, e.g., 0.1–25 percent D.S. A copolymer of vinyl acetate and acrylic acid or maleic acid is hydrolyzed to produce such a carboxylated copolymer. The copolymer, either with or without added carboxyl functionality, must have a molecular weight in excess of about 50,000 to yield a reinforced film of adequate strength.

In applying the polyvinyl alcohol copolymer to fibrous webs in aqueous alkaline solution, it is sometimes desirable to incorporate a cross-linking agent in the solution which will react with the copolymer during the drying of the same after acid regeneration to produce a film upon and within the web which is more insoluble in and relatively insensitive to water. It is also possible to treat the regenerated copolymer film subsequently with a cross-linking agent to reduce water sensitivity. Suitable cross-linking agents include aldehydes, such as formaldehyde, glyoxal, glutaraldehyde, etc.; diisocyanates, such as the diisocyanate of dimerized linoleic acid, 4,4'-methylene bis(cyclohexyl isocyanate), etc.; diisothiocyanates, such as the diisothiocyanate of dimerized linoleic acid, 4,4'-methylene bis(cyclohexyl isothiocyanate), etc.; polyepoxides, such as butadiene diepoxide and the like; polyamide epichlorohydrin resin; acyl halides, such as adipoyl chloride, sebacoyl chloride, etc.; and polymeric ketenes, such as the diketene of dimerized linoleic acid. In applying the cross-linking agents to insolubilize and desensitize the copolymer film to moisture, the less reactive cross-linking agents are applied in admixture with the aqueous alkaline solution of the polyvinyl alcohol copolymer. The aldehydes generally require acid conditions for cross-linking and thus become effective only after the coating solution is applied to the fibrous web and the coated web passed through an acid treating bath. In the case of the more reactive cross-linking agents, the polyvinyl alcohol copolymer may be applied to the fibrous web and subsequently treated with acid to regenerate a copolymer film in the web which is subsequently treated with the cross-linking agent in a separate treating step, preferably prior to drying and curing.

In preparing casings in accordance with this invention, it is preferred to use a fibrous web comprising a saturating tissue formed of long hemp fibers bonded together with a suitable wet strength sizing agent, such as regenerated cellulose or an insolubilized polyvinyl alcohol. Other nonwoven webs, such as Yoshino paper, rice paper, hemp, rayon, cotton, and nylon; and woven fabrics, such as muslin, marquisette, cheese cloth, organdie, and voile can be used. It should be understood that these fibrous webs are commercially available. The long fiber hemp paper (Dexstar paper) is generally preferred for reasons of maximum strength, ease of handling, and economy.

APPARATUS AND PROCESS FOR CASING PREPARATION

Referring to the drawings, there is shown a diagrammatic view of an apparatus for coating or impregnating a fibrous web and forming the same into a fibrous casing in accordance with this invention.

In the drawing, a ribbon of paper 11, preferably of the type described in U.S. Pat. No. 2,045,349 which is a long fiber hemp paper weighing in the range from 12–16 pounds per ream, depending upon the size and weight of casing being manufactured, passes from roll 12 over rollers 13 and 14 and around formers 15 and 16 which form the paper into tubular form. The paper formed into a tube then proceeds downwardly over a mandrel 17. Mandrel 17, which is preferably a hollow metal tube, e.g., a steel pipe, having an outside diameter of 2–7 inches, more or less, depending upon the size of the tube or casing which is to be produced, may be of any suitable length, conveniently about 30 feet long, and, as shown, can be suspended from a suitable support such as an I-beam 18 or the like.

The paper, now shaped in the form of a tube, passes downwardly over mandrel 17, through a forming ring 19 which is preferably a metallic ring having an inside diameter only slightly larger than the diameter of the tube-shaped paper passing through it and whose purpose it is to maintain the paper in tubular form until it reaches the coating die 20. Coating die 20 is essentially a hollow ring structure made of metal or the like and contains an annular opening 21 circumferentially of its inside diameter through which an aqueous alkaline solution of polyvinyl alcohol/polyvinyl ester copolymer, which is under positive pressure in the chamber of the die 20, is applied to the outer surface of the downwardly moving paper tube to uniformly coat it with said copolymer solution. The polyvinyl alcohol/polyvinyl ester copolymer solution is prepared in a mixing tank supplied to a holding tank from which it is introduced to the die as indicated diagrammatically in the drawing.

A sleeve 33 formed of metal or the like which is shrunk onto mandrel 17 functions to effect a more uniform application of the copolymer solution through the orifice 21 as the paper tube 11 passes downwardly thereover. A number of slip rings 22 which may be shrunk onto the mandrel 17 at suitable intervals, e.g., 3 feet, and which are made of metal or the like, function to keep the inside wall of the coated and/or impregnated paper tube from scraping against the outside wall of mandrel 17 as the tube moves downwardly.

The apparatus is arranged with mandrel 17 extending into container 23 which contains an acid coagulating bath 24 for neutralizing the alkaline solution to regenerate a polyvinyl alcohol/polyvinyl ester copolymer film within and upon the fibrous web. The mandrel 17 may be provided with an inlet pipe or conduit 25 and an outlet pipe or conduit 26 for conveying acid into and out of the interior of the tubular casing formed in the apparatus. The inside flow of acid is at a rate sufficient to maintain an acid level within the formed tube which is approximately equal to the level of acid bath 24 in container 23.

At the bottom of container 23 there is provided a roller 27. The casing is flattened in the bottom of the container 23 and passes around roller 27 and out of the regeneration bath. Casing 28 (as distinguished from the untreated paper 11 at the inlet end of the process) passes out of the coagulation bath and over a series of rollers which guide it into and out of a series of treating baths. Casing 28 passes over rollers 29, 30, 31, and 32 and into container 33a which contains an acid solution 34 for further neutralizing any residual alkali in the casing.

Casing 28 passes over roller 35 in the bottom of container 33a and then over rollers 36 and 37 and thence into wash tank 38. Wash tank 38 contains a quantity of wash water 39 for washing out acid and byproduct salts from the casing.

The casing passes over roller 40 in the bottom of container 38 and thereafter over rollers 41 and 42 and then into a second wash tank 43. Wash tank 43 contains a quantity of wash water 44 for further washing the casing. The casing passes over roller 45 in the bottom of tank 43 and thereafter over rollers 46 and 47 into container 48. Container 48 is filled with a plasticizing solution 49 such as an aqueous solution of glycerin or other suitable plasticizer for the copolymer film. If desired, the plasticizer bath may also contain a small amount of a cross-linking agent, such as formaldehyde, or the like, and a small amount of acid for catalyzing the cross-linking of the polyvinyl alcohol by the formaldehyde.

The casing passes over roller 50 in the bottom of container 48 and thence over rollers 51, 52 and 53 to the entrance to drier 54. At the entrance to drier 54, casing 28 passes between rollers 55 and 56 and is inflated by air pressure to form an enlarged trapped bubble of air as indicated at 57. At the outlet end of drier 54, the casing passes between rollers 58 and 59 and thence to storage reels (not shown). The arrangement of rollers 55 and 56 at the inlet end of drier 54 and rollers 58 and 59 at the outlet end of the drier trap a bubble of air in the drier which maintains the casing in an inflated condition while it is being dried and thus prevents excessive shrinkage of the casing during drying.

While the arrangement for preparing polyvinyl alcohol/polyvinyl ester copolymer coated or impregnated fibrous casing as shown in the drawing has the advantage of utilizing more or less standard equipment for the manufacture of cellulosic fibrous casings, the process is also applicable to the preparation of casing from coated or impregnated flat stock. The fibrous web 11 may be coated in any suitable flat web coater with an aqueous alkaline solution of the alkali soluble polyvinyl alcohol/polyvinyl ester copolymer and the copolymer precipitated or regenerated as a film within and upon the web by treating the coated or impregnated web in an acid coagulation or regeneration bath. The treated web is then subjected to a cross-linking treatment, if desired, and dried and stored on reels. In such a case, the coated web is subsequently slit to size and formed into tubular casing using conventional apparatus for forming and seaming longitudinally seamed tubes. The casing may be formed and seamed using any suitable adhesive for a polyvinyl alcohol/polyvinyl ester copolymer film. Suitable adhesives include molten plasticized polyvinyl alcohol or polyvinyl alcohol/polyvinyl ester copolymers, solutions of polyvinyl alcohol copolymers in volatile organic solvents, or reactive adhesives such as isocyanate, epoxy, or similar adhesives.

PREPARATION OF POLYVINYL ALCOHOL/POLYVINYL ESTER COPOLYMER FIBROUS CASINGS

In the series of examples set forth below, a fibrous web is coated or impregnated with a viscous aqueous alkaline solution of polyvinyl alcohol/polyvinyl ester copolymer and formed into a fibrous casing and the copolymer precipitated and regenerated by acid treatment. In preparing casings in accordance with this invention, different polyvinyl alcohol/polyvinyl ester copolymer compositions may be used and a variety of plasticizers may be used which are known in the prior art. The casing may be prepared at the time of impregnation of the fibrous web and regeneration of the copolymer film in the web as described above or the fibrous web may be coated in the flat bed coater by any of a variety of conventional apparatus for coating flat webs and subsequently seamed into fibrous casing using any of the well known adhesives for polyvinyl alcohol copolymers.

Example 1

A solution is prepared of 10 parts polyvinyl alcohol/polyvinyl acetate copolymer (D.S. 50 percent with respect to OH groups) in 100 parts of 4 percent aqueous sodium hydroxide. The solution produced is quite viscous and is applied to the fibrous web following the procedure shown in the drawing.

The 10 percent solution of polyvinyl alcohol copolymer passes from a mixing tank into a holding tank and thence is introduced into annular die 20. A 15 pound long fiber hemp paper (Dexstar tissue) is supplied from roll 12 through the apparatus shown in the drawing, formed into a tube and impregnated with polyvinyl alcohol copolymer solution through said annular die. The impregnated film has a wet thickness of about 50 mils at the time of impregnation.

The impregnated and coated fibrous web formed into a tube or casing passes downwardly into coagulation tank 23 which contains a coagulation bath comprising 5 parts concentrated sulfuric acid and 15 parts sodium sulphate per 100 parts water. In the coagulation solution 24, the polyvinyl alcohol is neutralized and regenerated as a film, thus producing a fibrous reinforced casing. A similar coagulation solution is pumped into inlet 25 and out of outlet 26.

The casing produced in bath 23 passes into bath 33a which contains dilute sulfuric acid to complete the neutralization of alkali remaining in the film. The casing then passes through wash bath 38 and 43 and finally through plasticizing bath 48 which contains a solution 49 comprising 30 percent glycerol in water. From the plasticizing bath, the casing passes through drier 54 where it is inflated and thoroughly dried and cured. The casing may be reequilibrated to a proper moisture content, e.g., 10–15 percent water, at the outlet end of the drier or in a separate moisture equilibration step.

The casing produced in this manner is quite strong and has a low degree of stretch. The casing has a break strength of about 15–20 pounds/inch width, and an elongation at break in a range from about 15–30 percent (compared to a break elongation of about 70 percent for fibrous cellulosic casings). When this casing is stuffed with bologna emulsion and cooked and smoked, the casing does not burst in processing and produces a sausage of very constant diameter.

Example 2

A solution is prepared of 10 parts polyvinyl alcohol/polyvinyl acetate copolymer (D.S. 70 percent with respect to OH groups) in 100 parts of 3 percent aqueous sodium hydroxide. The solution produced is quite viscous and is applied to the fibrous web following the procedure shown in the drawing.

The 10 percent solution of polyvinyl alcohol copolymer passes from a mixing tank into a holding tank and thence is introduced into annular die 20. A 15 pound long fiber hemp paper (Dexstar tissue) is supplied from roll 12 through the apparatus shown in the drawing, formed into a tube and impregnated with polyvinyl alcohol copolymer solution through said annular die. The impregnated film has a wet thickness of about 50 mils at the time of impregnation.

The impregnated and coated fibrous web formed into a tube or casing passes downwardly into coagulation tank 23 which contains a coagulation bath comprising 5 parts concentrated sulfuric acid and 15 parts sodium sulphate per 100 parts water. In the coagulation solution 24, the polyvinyl alcohol is neutralized and regenerated as a film, thus producing a fibrous reinforced casing. A similar coagulation solution is pumped into inlet 25 and out of outlet 26.

The casing produced in bath 23 passes into bath 33a which contains dilute sulfuric acid to complete the neutralization of alkali remaining in the film. The casing then passes through wash bath 38 and 43 and finally through plasticizing bath 48 which contains a solution 49 comprising 30 percent glycerol in water. From the plasticizing bath, the casing passes through drier 54 where it is inflated and thoroughly dried and cured. The casing may be reequilibrated to a proper moisture content, e.g., 10–15 percent water, at the outlet end of the drier or in a separate moisture equilibration step.

The casing produced in this manner is quite strong and has a low degree of stretch. The casing has a rewet break strength of about 15–20 pounds/inch width, and an elongation at break in a range from about 25–50 percent (compared to a break elongation of about 70 percent for fibrous cellulosic casings). When this casing is stuffed with bologna emulsion and cooked and smoked, the casing does not burst in processing and produces a sausage of very constant diameter.

Example 3

A solution is prepared of 10 parts polyvinyl alcohol/polyvinyl acetate copolymer (D.S. 40 percent with respect to OH groups) in 100 parts of 8 percent aqueous sodium hydroxide. The solution produced is quite viscous and is applied to the fibrous web following the procedure shown in the drawing.

The 10 percent solution of polyvinyl alcohol copolymer passes from a mixing tank into a holding tank and thence is introduced into annular die 20. A 15-pound long fiber hemp paper (Dexstar tissue) is supplied from roll 12 through the apparatus shown in the drawing, formed into a tube and impregnated with polyvinyl alcohol copolymer solution through said annular die. The impregnated film has a wet thickness of about 50 mils at the time of impregnation.

The impregnated and coated fibrous web formed into a tube or casing passes downwardly into coagulation tank 23 which contains a coagulation bath comprising 10 parts concentrated sulfuric acid and 20 parts sodium sulphate per 100 parts water. In the coagulation solution 24, the polyvinyl alcohol is neutralized and regenerated as a film, thus producing a fibrous reinforced casing. A similar coagulation solution is pumped into inlet 25 and out of outlet 26.

The casing produced in bath 23 passes into bath 33a which contains dilute sulfuric acid to complete the neutralization of alkali remaining in the film. The casing then passes through wash bath 38 and 43 and finally through plasticizing bath 48 which contains a solution 49 comprising 30 percent glycerol in water. From the plasticizing bath, the casing passes through drier 54 where it is inflated and thoroughly dried and cured. The casing may be reequilibrated to a proper moisture content, e.g., 10–15 percent water, at the outlet end of the drier or in a separate moisture equilibration step.

The casing produced in this manner is quite strong and has a low degree of stretch. The casing has a break strength of about 15–20 pounds/inch width, and an elongation at break in a range from about 15–30 percent (compared to a break elongation of about 70 percent for fibrous cellulosic casings). When this casing is stuffed with bologna emulsion and cooked and smoked, the casing does not burst in processing and produces a sausage of very constant diameter.

Example 4

A solution is prepared from a polyvinyl alcohol/polyvinyl acetate/polyacrylic acid terpolymer. The terpolymer contains about 0.5 percent acrylate and has a D.S. of about 50 percent with respect to OH groups. The acrylate portion of the terpolymer is responsible for a higher water solubility in aqueous alkali. A solution of the terpolymer is prepared comprising 10 parts of the terpolymer in 100 parts of 4 percent aqueous sodium hydroxide. The solution produced is quite viscous and is applied to the fibrous web following the procedure shown in the drawing.

The 10 percent solution of polyvinyl alcohol copolymer passes from a mixing tank into a holding tank and thence is introduced into annular die 10. A 15-pound long fiber hemp paper (Dexstar tissue) is supplied from roll 12 through the apparatus shown in the drawing, formed into a tube and impregnated with polyvinyl alcohol copolymer solution through said annular die. The impregnated film has a wet thickness of about 50 mils at the time of impregnation.

The impregnated and coated fibrous web formed into a tube or casing passes downwardly into coagulation tank 23 which contains a coagulation bath comprising 5 parts concentrated sulfuric acid and 15 parts sodium sulfate per 100 parts water. In the coagulation solution 24, the polyvinyl alcohol is neutralized and regenerated as a film, thus producing a fibrous reinforced casing. A similar coagulation solution is pumped into inlet 25 and out of outlet 26.

The casing produced in bath 23 passes into bath 33a which contains dilute sulfuric acid to complete the neutralization of alkali remaining in the film. The casing then passes through wash bath 38 and 43 and finally through plasticizing bath 48 which contains a solution 49 comprising 30 percent glycerol in water. From the plasticizing bath, the casing passes through drier 54 where it is inflated and thoroughly dried and cured. The casing may be reequilibrated to a proper moisture content, e.g., 10–15 percent water, at the outlet end of the drier or in a separate moisture equilibration step.

The casing produced in this manner is quite strong and has a low degree of stretch. The casing has a break strength of about 15–20 pounds/inch width, and an elongation at break in a range from about 15–30 percent (compared to a break elongation of about 70 percent for fibrous cellulosic casings). When this casing is stuffed with bologna emulsion and cooked and smoked, the casing does not burst in processing and produces a sausage of very constant diameter.

Example 5

A solution is prepared from a polyvinyl alcohol/polyvinyl acetate/polyacrylic acid terpolymer. The terpolymer contains about 8.0 percent acrylate and has a D.S. of about 30 percent with respect to OH groups. The acrylate portion of the terpolymer is responsible for a high water solubility in aqueous alkali. A solution of the terpolymer is prepared comprising 10 parts of the terpolymer in 100 parts of 4 percent aqueous sodium hydroxide. The solution produced is quite viscous and is applied to the fibrous web following the procedure shown in the drawing.

The 10 percent solution of polyvinyl alcohol copolymer passes from a mixing tank into a holding tank and thence is introduced into annular die 10. A 15-pound long fiber hemp paper (Dexstar tissue) is supplied from roll 12 through the apparatus shown in the drawing, formed into a tube and impregnated with polyvinyl alcohol copolymer solution through said annular die. The impregnated film has a wet thickness of about 50 mils at the time of impregnation.

The impregnated and coated fibrous web formed into a tube of casing passes downwardly into coagulation tank 23 which contains a coagulation bath comprising 5 parts concentrated sulfuric acid and 15 parts sodium sulfate per 100 parts water. In the coagulation solution 24, the polyvinyl alcohol is neutralized and regenerated as a film, thus producing a fibrous reinforced casing. A similar coagulation solution is pumped into inlet 25 and out of outlet 26.

The casing produced in bath 23 passes into bath 33a which contains dilute sulfuric acid to complete the neutralization of alkali remaining in the film. The casing then passes through wash bath 38 and 43 and finally through plasticizing bath 48 which contains a solution 49 comprising 30 percent glycerol in water. From the plasticizing bath, the casing passes through drier 54 where it is inflated and thoroughly dried and cured. The casing may be reequilibrated to a proper moisture content, e.g., 10–15 percent water, at the outlet end of the drier or in a separate moisture equilibration step.

The casing produced in this manner is quite strong and has a low degree of stretch. The casing has a break strength of about 15–20 pounds/inch width, and an elongation at break in a range from about 15–30 percent (compared to a break elongation of about 70 percent for fibrous cellulosic casings). When this casing is stuffed with bologna emulsion and cooked and smoked, the casing does not burst in processing and produces a sausage of very constant diameter.

Example 6

A solution is prepared from a terpolymer produced by partial hydrolysis of a copolymer of vinyl acetate and maleic acid. The terpolymer has a D.S. with respect to OH groups of about 50 percent and a carboxylate content of about 3.0 percent.

The solution consists of 10 parts of the terpolymer dissolved in 100 parts of 4 percent aqueous sodium hydroxide. The solution produced is quite viscous and is applied to the fibrous web following the procedure shown in the drawing.

The 10 percent solution of polyvinyl alcohol copolymer passes from a mixing tank into a holding tank and thence is introduced into annular die 10. A 15-pound long fiber hemp paper (Dexstar tissue) is supplied from roll 12 through the apparatus shown in the drawing, formed into a tube and impregnated with polyvinyl alcohol copolymer solution through said annular die. The impregnated film has a wet thickness of about 50 mils at the time of impregnation.

The impregnated and coated fibrous web formed into a tube of casing passes downwardly into coagulation tank 23 which contains a coagulation bath comprising 5 parts concentrated sulfuric acid and 15 parts sodium sulfate per 100 parts water. In the coagulation solution 24, the polyvinyl alcohol is neutralized and regenerated as a film, thus producing a fibrous reinforced casing. A similar coagulation solution is pumped into inlet 25 and out of outlet 26.

The casing produced in bath 23 passes into bath 33a which contains dilute sulfuric acid to complete the neutralization of alkali remaining in the film. The casing then passes through wash bath 38 and 43 and finally through plasticizing bath 48 which contains a solution 49 comprising 30 percent glycerol in water. From the plasticizing bath, the casing passes through drier 54 where it is inflated and thoroughly dried and cured. The casing may be reequilibrated to a proper moisture content, e.g., 10–15 percent water, at the outlet end of the drier or in a separate moisture equilibration step.

The casing produced in this manner is quite strong and has a low degree of stretch. The casing has a break strength of about 15–20 pounds/inch width, and an elongation at break in a range from about 15–30 percent (compared to a break elongation of about 70 percent for fibrous cellulosic casings). When this casing is stuffed with bologna emulsion and cooked and smoked, the casing does not burst in processing and produces a sausage of very constant diameter.

Example 7

A casing is prepared as described in Example 1 except that the plasticizing bath 48 is provided with about 1 percent formaldehyde and 0.2 percent lactic acid for cross-linking the casing. The casing picks up sufficient formaldehyde and lactic acid (as catalyst) in the plasticizing bath to effect cross-linking of the polyvinyl alcohol in the drier to reduce the water sensitivity of the resulting casing.

Example 8

A fibrous casing is prepared as described in Example 2 except that 0.2 percent trimethylol melamine is introduced into the polyvinyl alcohol solution just prior to extrusion. The trimethylol melamine is retained in the fiber-reinforced polyvinyl alcohol casing which is formed and functions to cross-link the casing during drying, if acid is also added in small amounts to the glycerol or if the casing is cured under acidic conditions.

Example 9

An alkaline solution of D.S. 50 percent polyvinyl alcohol is prepared as described in Example 1 and applied to a long fiber hemp paper (15-pound Dexstar paper) on a four-roll reverse roll coater. The coated and impregnated paper is then passed through a coagulation and regeneration bath of the same composition as that used in Example 1. The fiber-reinforced polyvinyl alcohol film is further treated in a dilute acid bath and thoroughly washed to remove byproduct salts. The fiber-reinforced film is then passed through an aqueous glycerin bath to plasticize the film and then is passed through a drier and stored on reels.

The fiber-reinforced polyvinyl alcohol copolymer film is slit to a desired size and formed into a tubing using a conventional longitudinal tube sealer. The fiber-reinforced film is formed into a tubular casing using a polyvinyl alcohol adhesive. The tubular casing which is formed is dried and stored on reels in preparation for use.

The casing prepared in this manner is of a strength comparable to that prepared by the process illustrated in the drawing and described in the preceding examples. The casing stuffed easily without breakage and does not tend to split or break during processing or cooking.

In the several examples given above, the polyvinyl alcohol was provided with glycerol as a plasticizer. In carrying out the preparation of casings in accordance with this invention, any plasticizer may be used which is suitable for producing a flexible film. Glycerol is the most widely used plasticizer for polyvinyl alcohol films, but in general high boiling water-soluble organic compounds containing hydroxyl, amide, or amino groups may be used. Suitable plasticizers include glycols and poly glycols, sorbitol, formamide, urea, etc.

The paper used in the above examples was a long fiber hemp paper. In general, any saturating tissue or nonwoven or woven web of suitable strength can be used. In some cases, a small amount of a surfactant or wetting agent may be added either before treatment or in admixture with the polyvinyl alcohol coating solution to effect a more thorough penetration of the polyvinyl alcohol solution into the web.

In preparing the copolymer solutions in the various examples above, sufficient alkali is used to dissolve the copolymer. Other suitable alkalis, e.g., KOH, $NH_4OH$, $(CH_3)_4NOH$, etc., may be used. Generally alkali concentrations of 1–20 percent are satisfactory. The coagulation and regeneration bath contains sufficient acid, e.g., 1–20 percent $H_2SO_4$, and salt, e.g., 5–25 percent $Na_2SO_4$ or 5–40 percent $(NH_4)_2SO_4$, to effectively produce a polyvinyl alcohol copolymer film. The copolymer requires a D.S. of OH groups in the range from 25–80 percent to yield a film having adequate moisture vapor permeability and smoke permeability. Copolymers containing 0.1–25 percent D.S. of carboxyl groups are alkali soluble over the range of D.S. 25–80 percent OH groups. Copolymers containing no carboxyl functionality are not soluble at a D.S. below about 50 with respect to OH groups.

In preparing casings in accordance with this invention, colored casings may be produced by incorporating F.D.A. and U.S.D.A. approved pigments in the polyvinyl alcohol coating solution.

The tubular casings produced in accordance with this invention are useful primarily for processing and packaging sausages such as bologna, etc. These casings may also be used for packaging food and other products. The casings are also useful as semipermeable membranes for purification of water by reverse osmosis and as hemodialysis membranes in artificial kidney machines.

We claim:

1. A synthetic meat casing comprising a tube of a long fiber saturating tissue longitudinally seamed and saturated and coated with an alkali-soluble polyvinyl alcohol/polyvinyl ester copolymer, having a D.S. of 25–80 percent with respect to OH groups and a molecular weight greater than about 50,000.

2. A meat casing as defined in claim 1 in which the copolymer contains 0.1–25 percent D.S. of carboxyl functionality.

3. A meat casing as defined in claim 1 in which the casing is formed into a tube at the time of saturating and coating.

4. A meat casing as defined in claim 1 in which the casing is saturated and coated as flat stock, dried, and subsequently formed into a tube with an adhesively bonded seam.

5. A meat casing as defined in claim 4 in which the adhesive used to form said seam is a polyvinyl alcohol or an adhesive chemically reactive with polyvinyl alcohol.

6. A method of preparing a synthetic meat casing comprising, a. saturating and coating a long fiber saturating tissue with an aqueous alkaline solution of an alkali-soluble polyvinyl alcohol/polyvinyl ester copolymer having a D.S. of 25–80 percent with respect to OH groups and a molecular weight greater than about 50,000.

b. contacting the coated and saturated tissue with an acid bath to coagulate and regenerate said polymer and produce a fiber-reinforced film,
c. forming said tissue longitudinally into a tube and forming a seam therein,
d. washing said acid treated tissue to remove byproduct salts, and
e. drying said saturated and coated tissue.

7. A method as defined in claim 6 in which the casing is formed into a tube at the time of saturating and coating.

8. A method as defined in claim 6 in which said casing is impregnated with a plasticizer for polyvinyl alcohol.

9. A method as defined in claim 6 in which said tissue is formed into a tube prior to contacting said acid bath.

10. A method as defined in claim 6 in which said tissue is formed into a tube having a longitudinal seam secured by adhesive, subsequent to drying.

11. A method as defined in claim 6 in which said copolymer is polyvinyl alcohol/polyvinyl acetate, or polyvinyl alcohol/polyvinyl acetate copolymerized with acrylic or maleic acid.

12. A method as defined in claim 6 in which said copolymer coating is cross-linked by reaction with a cross-linking agent for polyvinyl alcohol.

13. A method as defined in claim 9 in which a cross-linking agent is added in admixture with said copolymer solution.

14. A method as defined in claim 12 in which the coated and saturated tissue is contacted with a cross-linking agent.

* * * * *

Disclaimer

3,640,734.—*Seymour Oppenheimer*, Chicago, and *Albin F. Turbak*, Danville, Ill. PREPARATION OF FIBROUS REINFORCED CASING FROM ALKALI SOLUBLE POLYVINYL ALCOHOL COPOLYMERS. Patent dated Feb. 8, 1972. Disclaimer filed Dec. 7, 1971, by the inventors, the assignee, *Tee-Pak, Inc.*, consenting.

Hereby disclaims the portion of the term of the patent subsequent to Feb. 8, 1989.

[*Official Gazette May 29, 1973.*]